United States Patent
Sawatzky et al.

(10) Patent No.: US 6,966,269 B2
(45) Date of Patent: Nov. 22, 2005

(54) MULTI-PURPOSE GARDEN TOOL

(76) Inventors: Brian Sawatzky, Box 342, Pierceland, Saskatchewan (CA) S0M 2K0; Wayne Sawatzky, Box 342, Pierceland, Saskatchewan (CA) S0M 2K0

( * ) Notice: Subject to any disclaimer, the term of this patent is extended or adjusted under 35 U.S.C. 154(b) by 0 days.

(21) Appl. No.: 10/322,414

(22) Filed: Dec. 18, 2002

(65) Prior Publication Data

US 2004/0118328 A1    Jun. 24, 2004

(51) Int. Cl.[7] ............................................. A01C 11/00
(52) U.S. Cl. ....................................... 111/100; 111/92
(58) Field of Search ................. 111/100, 101, 92; 294/56.8, 50.9, 51; 30/124, 128, 130, 131, 30/134

(56) References Cited

U.S. PATENT DOCUMENTS

| | | | |
|---|---|---|---|
| 71,133 A * | 11/1867 | Carmichael | 111/101 |
| 278,017 A * | 5/1883 | Howells | 30/134 |
| 293,652 A * | 2/1884 | Gross | 111/101 |
| 409,949 A * | 8/1889 | Foster | 111/101 |
| 437,466 A * | 9/1890 | Vogel | 294/50.8 |
| 802,053 A * | 10/1905 | Millea | 30/241 |
| 938,651 A | 11/1909 | Doughty | |
| 974,077 A | 10/1910 | Kleeberger | |
| 1,356,146 A * | 10/1920 | Josephus | 111/101 |
| 1,597,281 A * | 8/1926 | Mills | 111/101 |
| 1,978,124 A * | 10/1934 | Batchler | 606/116 |
| 2,149,880 A * | 3/1939 | Boordsen | 111/92 |
| 2,239,108 A * | 4/1941 | Lindemann | 294/118 |
| 2,639,935 A * | 5/1953 | Foulke | 111/101 |
| 2,710,765 A * | 6/1955 | Arens | 294/50.6 |
| 2,938,266 A * | 5/1960 | Klein, Jr. | 30/124 |
| 3,592,272 A * | 7/1971 | Perez | 172/375 |
| 4,082,048 A | 4/1978 | Grundstrom et al. | 111/2 |
| 4,489,969 A * | 12/1984 | Merry | 294/50.8 |
| 4,700,420 A * | 10/1987 | Belanger | 7/114 |
| 4,706,582 A | 11/1987 | Keskilohko | 111/4 |
| 5,383,274 A * | 1/1995 | Miller | 30/134 |
| 5,431,467 A * | 7/1995 | Mlecka | 294/51 |
| 5,743,579 A * | 4/1998 | Ranburger | 294/50.8 |
| 5,815,866 A * | 10/1998 | Janky | 7/114 |
| 5,904,106 A | 5/1999 | Swift, Sr. et al. | 111/106 |
| 5,924,369 A | 7/1999 | Hatcher | 111/92 |
| 6,338,512 B1 * | 1/2002 | Ruppert et al. | 294/50.8 |
| 6,647,627 B2 * | 11/2003 | Nickel | 30/135 |

* cited by examiner

*Primary Examiner*—Thomas B Will
*Assistant Examiner*—Nathan S Mammen
(74) *Attorney, Agent, or Firm*—Sturm & Fix LLP

(57) ABSTRACT

A multi-purpose garden tool (10) including a pair of blade assemblies (20)(20') wherein, each blade assembly (20) includes a handle portion (21), a shank portion (22) and a contoured blade portion (23) wherein, the shank portions (22)(22') are pivotally secured to one another as at (28); and, wherein each of the contoured blade portions (23)(23') define one-half of a hollow frustro-conical configuration and the rear edges (24)(24') of the blade portions (23)(23') and the interior faces of the shank portions (22) (22') are sharpened to function as scissors.

3 Claims, 2 Drawing Sheets

MULTI-PURPOSE GARDEN TOOL

CROSS REFERENCE TO RELATED APPLICATIONS

Not applicable.

BACKGROUND OF THE INVENTION

1. Field of the Invention

The present invention relates to the field of combination garden tools in general and in particular to a combined dibbler, transplanter, pruner device for usage in a garden, greenhouse and agricultural applications.

2. Description of Related Art

As can be seen by reference to the following U.S. Pat. Nos. 5,904,106; 974,077; 938,651; 4,082,048; 5,924,369, and 4,706,582, the prior art is replete with myriad and diverse planting and dibbling devices.

While all of the aforementioned prior art constructions are more than adequate for the basic purpose and function for which they have been specifically designed, they are uniformly deficient with respect to their failure to provide a simple, efficient, and practical combined garden tool that can be used to perform a variety of different gardening tasks such as dibbling, transplanting and pruning.

As most gardeners are all too well aware, most gardening tasks require specialized tools which leads to unnecessary clutter in their gardening sheds and the increased likelihood that one or more of these specialized tools will become misplaced, lost or broken usually around the exact time that the tool is needed to perform a particular chore.

As a consequence of the foregoing situation, there has existed a longstanding need among gardeners for a new and improved combined gardening tool that can perform the following tasks: dibbling, transplanting and pruning; and, the provision of such a combined tool is the stated objective of the present invention.

BRIEF SUMMARY OF THE INVENTION

Briefly stated, the combined gardening tool that forms the basis of the present invention comprises in general a pair of specially contoured black assemblies that are pivotally connected together proximate their respective midpoints.

As will be explained in greater detail further on in the specification, each of the blade assemblies has a handle portion, an intermediate shank portion, and a contoured blade portion wherein, the contoured blade portion are mirror images of one another and form the heart of the present invention in that they can function as a pruner, a dibbler, and a transplanter.

In addition, each of the blade portions define one-half of a hollow generally frustro-conical configuration wherein, both the front and rear faces of each blade portion has a vertical edge. Furthermore, the rear vertical edges are sharpened to provide pruning blades and the front vertical edges diverge into upper angled edges that form an upper notch in the front face of the garden tool when the blade portions are joined together.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
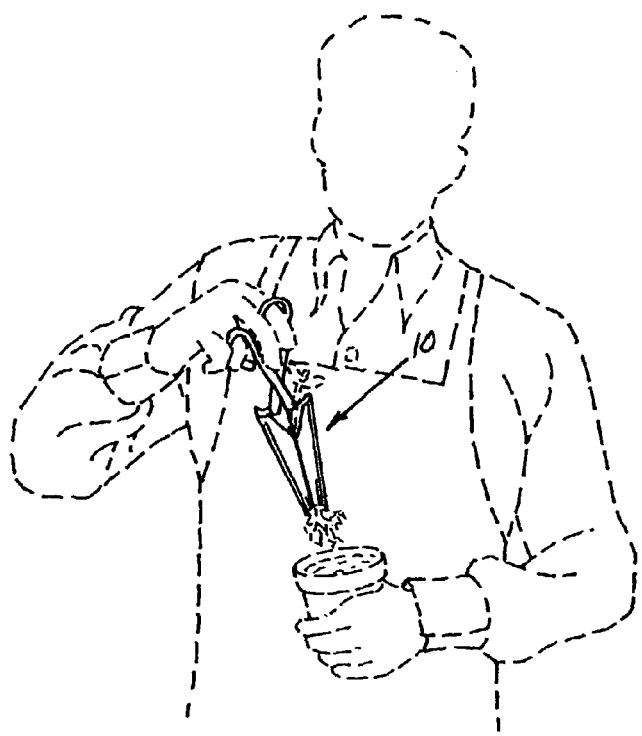
FIG. 1 is a perspective view of the multi-purpose gardening tool in use.
Figure 2:
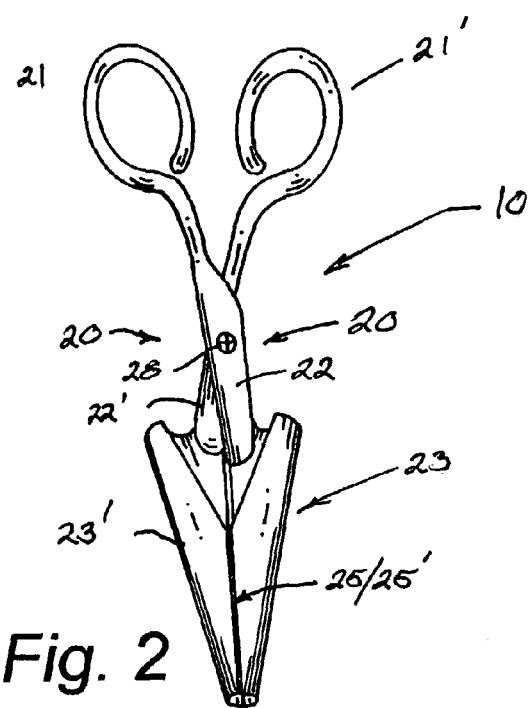
FIG. 2 is an isolated front perspective view of the combined gardening tool.

As can be seen by reference to the drawings, and in particular to FIGS. 1 and 2, the multi-purpose gardening tool that forms the basis of the present invention is designated by the reference number 10. The gardening tool comprises a pair of contoured mirror image blade assemblies (20) (20') wherein, each blade assembly such as (20) includes an upper handle portion (21), an intermediate shank portion (22) and a contoured blade portion (23) wherein, the shank portions (22) (22') of each blade assembly (20) (20') are pivotally connected to one another as at 28.

Figure 3:
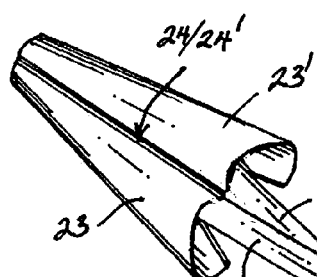
FIG. 3 is a rear perspective view of the gardening tool.
Figure 4:
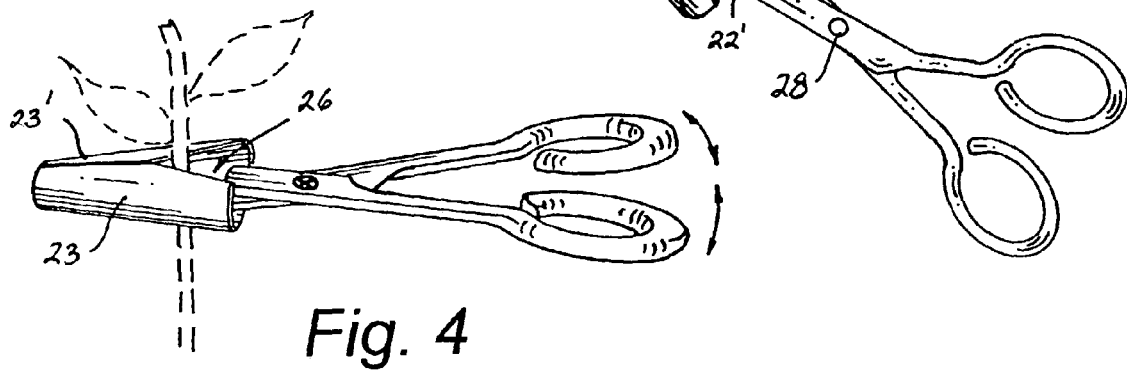
FIG. 4 is a perspective view of the gardening tool used as a pruner.

As can best be appreciated by reference to FIGS. 2 through 4, each of the contoured blade portions (23) (23') is a mirror image of the other wherein, each blade portion such as (23) has a contour that defines one-half of a generally hollow frustro-conical configuration wherein, the lower end of the shank portions (22)(22') of each blade assembly (20) is fixedly secured to the wide upper rear face of each blade portion (23) and the abutting vertical rear edges (24/24') of each blade portion (23) (23') as well as the abutting faces of the shank portions (22) (22') are sharpened to a knife edge that will function as a pruner as depicted in FIG. 4.

Still referring to FIGS. 2 through 4, it can be seen that the front face of each blade portion (23)(23') has abutting vertical edges (25/25') extending upwardly from their tapered lower ends wherein, the abutting edges (25/25') diverge toward the top of the blade portions (23)(23') to form a notch (26) that will facilitate the pruning process.

Figure 5A:
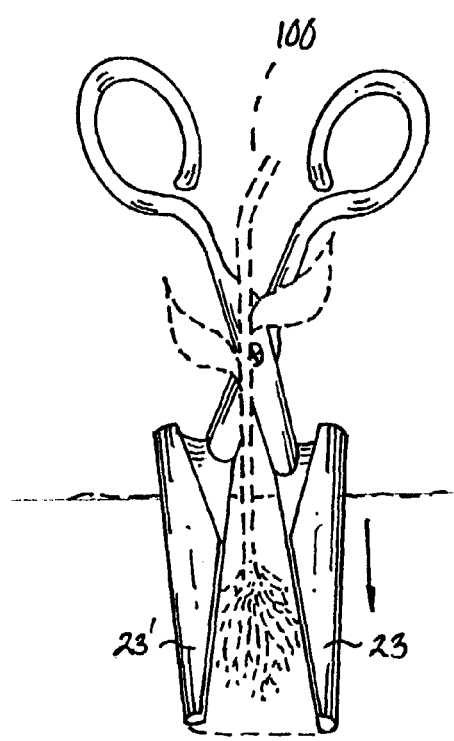
FIGS. 5A through 5D show the gardening tool used as both a dibbler and a transplanter.
Figure 5B:
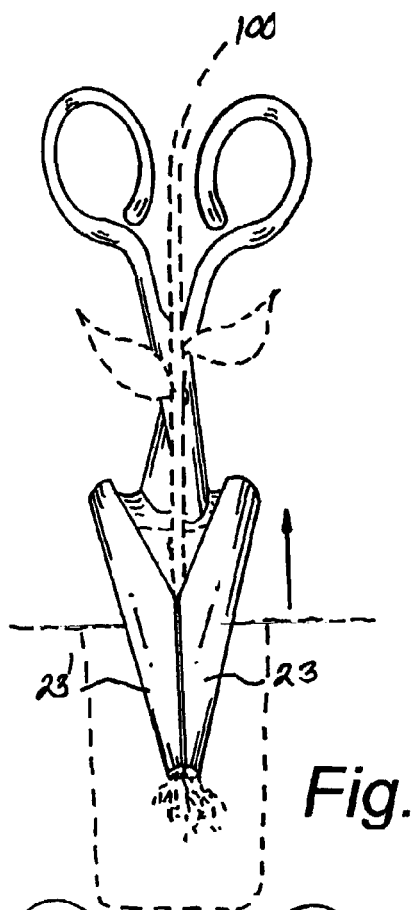
Figure 5C:
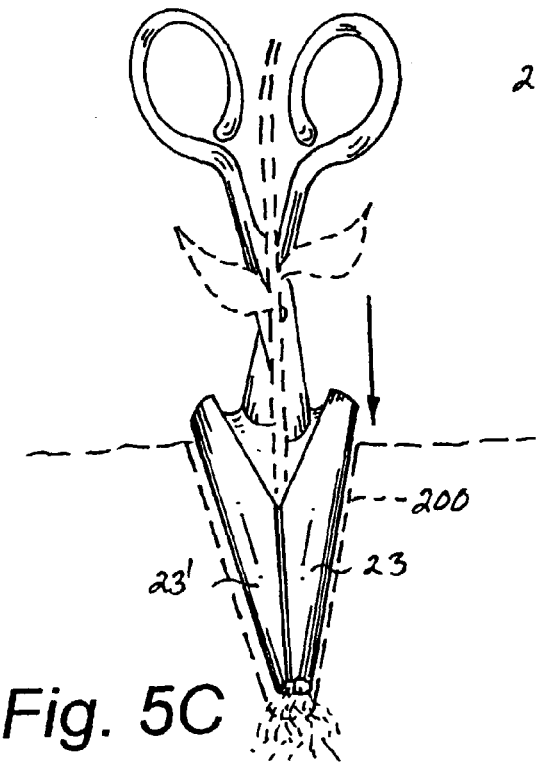
Figure 5D:
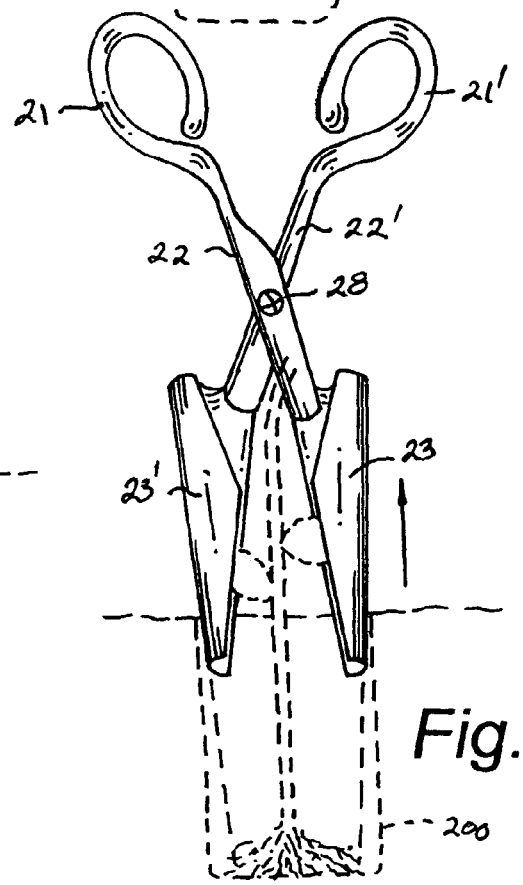

Turning now to FIGS. 5A through 5D, it can be seen that the multi-purpose garden tool (10) may be employed both as a dibbler to punch holes in the soil, as well as, a transplanter. When used as a dibbler, the blade portions (23)(23') can be joined together to form a narrow dibble hole (200) as shown in FIG. 5C whereupon the blade portions (23)(23') can be subsequently spread apart in a well recognized manner and rotated into a generally cylindrical configuration.

Then when it is desired to transplant a young plant (100), the blade portions (23)(23') are spread apart to pass downwardly on either side of the stem and root system of the young plant (100) whereupon the blade portions (23)(23') are pivoted toward one another by the handle portions (21)(21') to captively engage and remove the stem and root system of the young plant (100) from its seedling bed for transfer to an enlarged dibble hole (200) as depicted in FIGS. 5A through 5C.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A multi-purpose garden tool adapted for pruning, dibbling and transplanting wherein, the garden tool comprises a pair of blade assemblies pivotally connected to one another wherein, each blade assembly includes a handle portion, a shank portion and a contoured blade portion having a rear face which are generally aligned relative to one another and the blade portion further has a front face wherein the blade portions are mirror images of one another and each blade portion defines one-half of a substantially continuous hollow frusto-conical configuration which terminates at its lower end in a generally flat circular configuration; and wherein, the front face of each blade portion has an upper edge that is angled away from the engageable vertical edges of each front edge wherein, the upper angled edges define a notch when the front vertical edges are joined together wherein, at least a substantial portion of the rear vertical edge of each blade portion is sharpened and adapted to engage the opposing blade portion along their respective lengths such that when the sharpened rear blade edges are joined together they are adapted to sever the stem of a flower; and wherein, the notch in the upper end of the the front blade edges are adapted to receive the remaining portion of the stem bearing the flower.

2. The garden tool as in claim 1; wherein, each shank portion has a lower end and each blade portion has an upper end and front and rear faces provided with vertical edges wherein, the lower end of the shank portion is secured to the upper end of the blade portion adjacent the rear vertical edge.

3. The garden tool as in claim 1; wherein, each shank portion has a vertical edge that is sharpened.

* * * * *